United States Patent Office.

FRANKLIN B. NORTON, OF WORCESTER, MASSACHUSETTS.

ART OF PREPARING EMERY IN THE MANUFACTURE OF GRINDING-TOOLS.

SPECIFICATION forming part of Letters Patent No. 237,311, dated February 1, 1881.

Application filed March 22, 1880. (Specimens.)

*To all whom it may concern:*

Be it known that I, FRANKLIN B. NORTON, of Worcester, in the county of Worcester and State of Massachusetts, have invented certain new and useful Improvements in the Art of Preparing Emery in the Manufacture of Grinding-Wheels and Similar Articles; and I declare the following to be a description of my said invention sufficiently full, clear, and exact to enable others skilled in the art to which it appertains to make and use the same.

In the manufacture of solid grinding-wheels and similar articles, which are made from ordinary granulated and graded emery mixed with suitable vitrifiable substances molded into shape and subsequently burned or baked in kilns for solidifying or hardening the mass, it has heretofore been found impossible, owing to certain properties inherent to emery in its ordinary condition, to produce uniformly good wheels or articles, since a large proportion of those made become cracked, damaged, or destroyed in the firing or baking operation, especially with pieces of large size. The extent of loss from this cause is probably not less than fifty per cent. of the whole, as not more than one-half of all the wheels or other articles which are made and put into the firing-kilns come out after the firing in such condition as to be of any value, the balance of them being warped, burst open, cracked, or otherwise destroyed during the burning operation.

The object of my invention is to overcome or obviate this destructive effect and to provide a method whereby grinding-wheels and similar articles formed of or containing emery can be manufactured with facility and without the excessive loss in the firing operation, to attain better and more uniform results in the quantity, condition, and quality of the articles produced, and to render practicable the construction of wheels in larger sizes than heretofore.

To this end my invention consists in the method, treatment, or process of manufacture hereinafter described and claimed.

In carrying out my invention I take comminuted emery as ordinarily granulated and graded for the market. This I place within stoneware receptacles or seggars, which are put into a suitable furnace or kiln, where the emery is exposed to the action of fire, carrying the temperature of the mass to a white heat, or nearly so, and holding it at such heated temperature for a sufficient time to enable the fire or heat to act upon the emery to calcine it or to eliminate therefrom such properties as would tend to promote injurious effects in any subsequent firing operation, or when finally burning the molded wheels. The layers of emery placed in the seggars for firing may be one or two inches (more or less) in thickness, that which is of fine grains being worked in thinner layers than that with coarser grains, and the time of firing may occupy about forty hours, more or less, according to facilities, quantity of material treated, and other circumstances, the white-heat temperature being maintained from three to six hours, or as required to effect the desired result. This preliminary firing, by rendering the particles of emery more rough and jagged, enhances their cutting-power, and also causes a more firm adhesion among them when in the wheels, &c. The emery, after being treated as above described, is taken from the furnace, and when cooled is ready for use in the construction of grinding wheels and tools, for which purpose it is mixed with pulverized feldspar, vitreous clay, or other suitable vitrifiable material in the requisite proportions, and with sufficient moisture to form a plastic mass, which is pressed into molds or formed to the required shape and size, then dried, and subsequently placed in the furnace or kiln in seggars, and burned or baked in the manner of ordinary pottery at a degree and for a time sufficient to vitrify the material, and thus solidify the mass into fixed or permanent form.

An ordinary pottery-kiln may be used for the firing operations, or they may be performed in a furnace of other construction or on a hearth.

Grinding-wheels and other similar articles, when made from emery treated in the manner above described, are not liable to become cracked or damaged while being burned or vitrified, and such wheels can be readily and successfully made by my process of very large sizes without danger of loss, or in sizes greatly exceeding any which can be practically made by the ordinary method. The wheels are also more uniform and firm in texture, while their working qualities are superior in their greater durability, sharpness of grit, and non-liability to glaze.

It will thus be seen that by my invention the waste of materials is prevented, the cost of manufacture reduced, the results rendered more certain and uniform, and a superior article produced.

The granulated and graded emery for the market or for use in all mechanical, grinding, or polishing purposes can be treated in the manner hereinbefore described with beneficial results in its use.

What I claim as of my invention, and desire to secure by Letters Patent, is—

1. In the manufacture of solid, burned, or vitrified grinding-wheels and similar articles formed of or containing emery, the process or method of preventing the destruction or damage of the product, which consists in preparing the emery previous to its incorporation into such wheels, &c., by means of a preliminary firing operation, substantially as hereinbefore set forth.

2. In the manufacture of grinding-wheels and similar articles from emery, the improved process hereinbefore described, which consists in treating the emery, when granulated and graded for use, to a preliminary firing or roasting operation at white-heat temperature, incorporating the so-treated emery with the other ingredients of the article, molding the mass to the shape required, and then finally subjecting the molded article to a second firing or vitrifying operation for solidifying or hardening the molded mass into fixed or permanent form, as set forth.

Witness my hand this 18th day of March, A. D. 1880.

FRANKLIN B. NORTON.

Witnesses:
CHAS. H. BURLEIGH,
GEO. M. REED.